United States Patent
Miyazaki

(10) Patent No.: US 7,114,540 B2
(45) Date of Patent: Oct. 3, 2006

(54) PNEUMATIC TIRE INCLUDING TREAD WITH MAIN GROOVES

(75) Inventor: Tetsuji Miyazaki, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 182 days.

(21) Appl. No.: 10/819,919

(22) Filed: Apr. 8, 2004

(65) Prior Publication Data

US 2005/0092413 A1  May 5, 2005

(30) Foreign Application Priority Data

Oct. 30, 2003  (JP) ............................. 2003-370987

(51) Int. Cl.
 B60C 11/03 (2006.01)
 B60C 11/04 (2006.01)
 B60C 11/11 (2006.01)
(52) U.S. Cl. ..................... 152/209.21; 152/209.24; 152/900; 152/902
(58) Field of Classification Search ........... 152/209.18, 152/209.21, 209.24, 900, 902
 See application file for complete search history.

(56) References Cited

U.S. PATENT DOCUMENTS 3,951,193 A * 4/1976 Yeager ................. 152/209.21
4,796,683 A * 1/1989 Kawabata et al. ..... 152/209.24
5,099,899 A * 3/1992 Takeuchi ............... 152/209.21
2002/0062892 A1* 5/2002 Himuro ................. 152/209.18

FOREIGN PATENT DOCUMENTS

| JP | 1-204805 | * 8/1989 |
| JP | H7-115569 | 12/1995 |
| JP | 2000-225812 | 8/2000 |

* cited by examiner

*Primary Examiner*—Steven D. Maki
(74) *Attorney, Agent, or Firm*—Stephen B. Parker; Watchstone P&D, llc

(57) ABSTRACT

A pneumatic tire includes main grooves 1 extending substantially in a circumferential direction R of the tire, transverse grooves 2 connecting adjacent main grooves, and blocks 3 formed by adjacent main grooves and adjacent transverse grooves. Each block 3 has an acute corner portion 3a and an obtuse corner portion 3b and also has a groove side extending along the main groove 1 between the acute corner portion 3a and the obtuse corner portion 3b. An inclination angle a1 of the groove side increases from the obtuse corner portion 3b toward the acute corner portion 3a. An extending direction 1a of the main groove 1 at a tread surface level is inclined toward one side of the main groove 1 with respect to the circumferential direction R of the tire, while an extending direction of the main groove 1 at a groove bottom level is inclined toward the other side.

6 Claims, 8 Drawing Sheets

PNEUMATIC TIRE INCLUDING TREAD WITH MAIN GROOVES

This application claims priority under 35 U.S.C. § 119 to Japanese Patent Application No. P2003-370987 filed on Oct. 30, 2003, the entire disclosure of which is incorporated herein by reference in its entirety.

BACKGROUND OF THE INVENTION

1. Field of the Invention

This invention relates to a pneumatic tire having substantial parallelogram block patterns. More specifically, it relates to a pneumatic tire capable of preventing irregular wear at the wear early stage and obtaining sufficient drainage and traction performance at the wear end stage.

2. Description of the Background

The following description sets forth the inventor's knowledge and should not be construed as an admission that the description constitutes prior art.

In pneumatic tires having substantial parallelogram block patterns, the block is smaller in rigidity at the acute corner portion than at the obtuse corner portion, causing irregular wear.

In order to prevent such irregular wear, the groove side of the block was so designed that the inclination angle of the groove side at the acute corner portion was set to be larger than that of the groove side at the obtuse corner portion. Consequently, the rigidity at the acute corner portion was enhanced and therefore the rigidity of the block was equalized at these corner portions, preventing irregular wear of the block. For example, a pneumatic tire disclosed in Japanese Examined Laid-open Patent Publication H7-155569 is known.

In such a conventional pneumatic tire, the inclination angle of the groove side of the block is different between at the obtuse corner portion and at the acute corner portion. Therefore, the extending direction of the main groove at the tread surface level and that at the groove bottom level are different.

For example, FIG. 1 shows a pattern of a pneumatic tire in which main groove 101 extends substantially in a circumferential direction R of the tire and transverse groove 102 extends obliquely with respect to the widthwise direction A of the tire and connects the main grooves 101. Thus, substantial parallelogram blocks 103 are formed. In FIG. 1, the groove side 104b at the side of the obtuse corner portion 103b of the block 103 is substantially vertical, while the groove side 104a at the side of the block acute corner portion 103a is inclined. Since the traction performance can be improved in cases where the main grooves 101 extend obliquely with respect to the circumferential direction R of the tire, the extending direction 101a of the main groove 101 on a tread surface level is formed obliquely with respect to the circumferential direction R of the tire. As the tread wear increases, however, the extending direction 101b of the main groove 101 comes closer to the circumferential direction R of the tire due to the inclination of the groove side 104. As a result, the traction performance deteriorates at the wear end stage.

On the other hand, in another pattern of a pneumatic tire shown in FIG. 2, the extending direction 201a of the main groove 201 at the tread surface level is set to be substantially coincide with the circumferential direction R of the tire. Since the groove side 204b at the side of the obtuse corner portion 203b of the block is substantially vertical and the groove side 204a at side of the acute corner portion 203a of the block is inclined, the main groove 201 extends obliquely with respect to the circumferential direction R of the tire at the groove bottom level. This causes the width of the main groove 201 to be decreased as the wear increases, decreasing the width of the main groove 201 and deteriorating the drainage performance as the wear increases. As described above, it has been difficult to keep both the good traction performance and the good drainage performance at the same time at the wear end stage.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a pneumatic tire capable of attaining good drainage performance and good traction performance at the wear end stage and preventing irregular wear at the wear early stage.

According to a first aspect of a preferred embodiment of the present invention, a pneumatic tire includes main grooves formed on a tread of the tire, each of the main grooves extending substantially in a circumferential direction of the tire, transverse grooves formed on the tread, each of the transverse grooves connecting adjacent main grooves, and blocks each formed by the adjacent main grooves and adjacent transverse grooves, each of the blocks having an acute corner portion and an obtuse corner portion on at least one side of a widthwise direction of the tire and also having a groove side extending along one of the main grooves between the acute corner portion and the obtuse corner portion, wherein an inclination angle of the groove side of each of the blocks increases from the obtuse corner portion toward the acute corner portion, the inclination angle being defined by an angle formed between an inclination direction of the groove side and a radial direction of the tire at a transverse cross-section of the tire, and wherein an extending direction of the one of the main grooves formed between adjacent blocks at a tread surface level is inclined toward one side of the one of the main grooves with respect to the circumferential direction of the tire, while an extending direction of the one of the main grooves formed between adjacent blocks at a groove bottom level is inclined toward the other side of the one of the main grooves with respect to the circumferential direction of the tire.

According to a second aspect of the preferred embodiment of the present invention, a pneumatic tire includes main grooves formed on a tread of the tire, each of the main grooves extending substantially in a circumferential direction of the tire, transverse grooves formed on the tread, each of the transverse grooves connecting adjacent main grooves and extending obliquely with respect to a widthwise direction of the tire, and blocks each having a substantial parallelogram shape formed by the adjacent main grooves and adjacent transverse grooves, each of the block having an acute corner portion and an obtuse corner portion and also having a groove side extending along the one of the main grooves between the acute corner portion and the obtuse corner portion, wherein an inclination angle of the groove side of each of the blocks increases from the obtuse corner portion toward the acute corner portion, the inclination angle being defined by an angle formed between an inclination direction of the groove side and a radial direction of the tire at a transverse cross-section of the tire, and wherein an extending direction of the one of the main grooves formed between adjacent blocks at a tread surface level is inclined toward one side of the one of the main grooves with respect to the circumferential direction of the tire, while an extending direction of the one of the main grooves formed between adjacent blocks at a groove bottom level is inclined toward the other side of the one of the main grooves with respect to the circumferential direction of the tire.

According to a third aspect of the preferred embodiment of the present invention, a pneumatic tire includes ribs each formed by main grooves extending substantially in a circumferential direction of the tire and transverse grooves extending obliquely with respect to a widthwise direction of the tire, each of the ribs having acute corner portions and obtuse corner portions and also having a groove side extending along one of the main grooves between the acute corner portion and the obtuse corner portion, wherein an inclination angle of the groove side of each of the ribs increases from the obtuse corner portion toward the acute corner portion, the inclination angle being defined by an angle formed between an inclination direction of the groove side and a radial direction of the tire at a transverse cross-section of the tire, and wherein an extending direction of the one of the main grooves formed between adjacent ribs at a tread surface level is inclined toward one side of the one of the main grooves with respect to the circumferential direction of the tire, while an extending direction of the one of the main grooves formed between adjacent ribs at a groove bottom level is inclined toward the other side of the one of the main grooves with respect to the circumferential direction of the tire.

In the aforementioned pneumatic tire, blocks or ribs have acute corner portions and obtuse corner portions and the extending direction of the main groove at the tread surface level and the extending direction of the main groove at the groove bottom level are different with respect to the circumferential direction of the tire. Since the main groove extends obliquely with respect to the circumferential direction of the tire at the wear early stage, good traction performance can be attained. Furthermore, since the inclination angle of the groove side at the side of the acute corner portion of the block or the rib is greater than that at the side of the obtuse corner portion, irregular wear can be prevented. At the wear end stage, since the main groove extends in an oblique direction with respect to the circumferential direction of the tire which is opposite to the extending direction of the main groove at the tread surface level, good traction performance can be acquired as well. Moreover, since the direction of the main groove changes to the opposite direction with respect to the circumferential direction of the tire as the wear increases, the width of the main groove does not become extremely narrow, keeping the excellent drainage performance.

Although it is not specifically limited, it is preferable that the narrowest gap of the main groove at the groove bottom level is not less than 0 but not larger than the narrowest gap of the main groove at the tread surface level. By making the narrowest gap of the main groove at the groove bottom level not less than 0, sufficient capacity of the main groove can be obtained, resulting in sufficient drainage performance. Further, since the narrowest gap of the main groove at the groove bottom level does not exceed the narrowest gap of the main groove at the tread surface level, sufficient inclination of the groove side can be attained, sufficiently preventing the irregular wear.

The above and/or other aspects, features and/or advantages of various embodiments will be further appreciated in view of the following description in conjunction with the accompanying Figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF THE DRAWINGS

The preferred embodiments of the present invention are shown by way of example, and not limitation, in the accompanying Figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
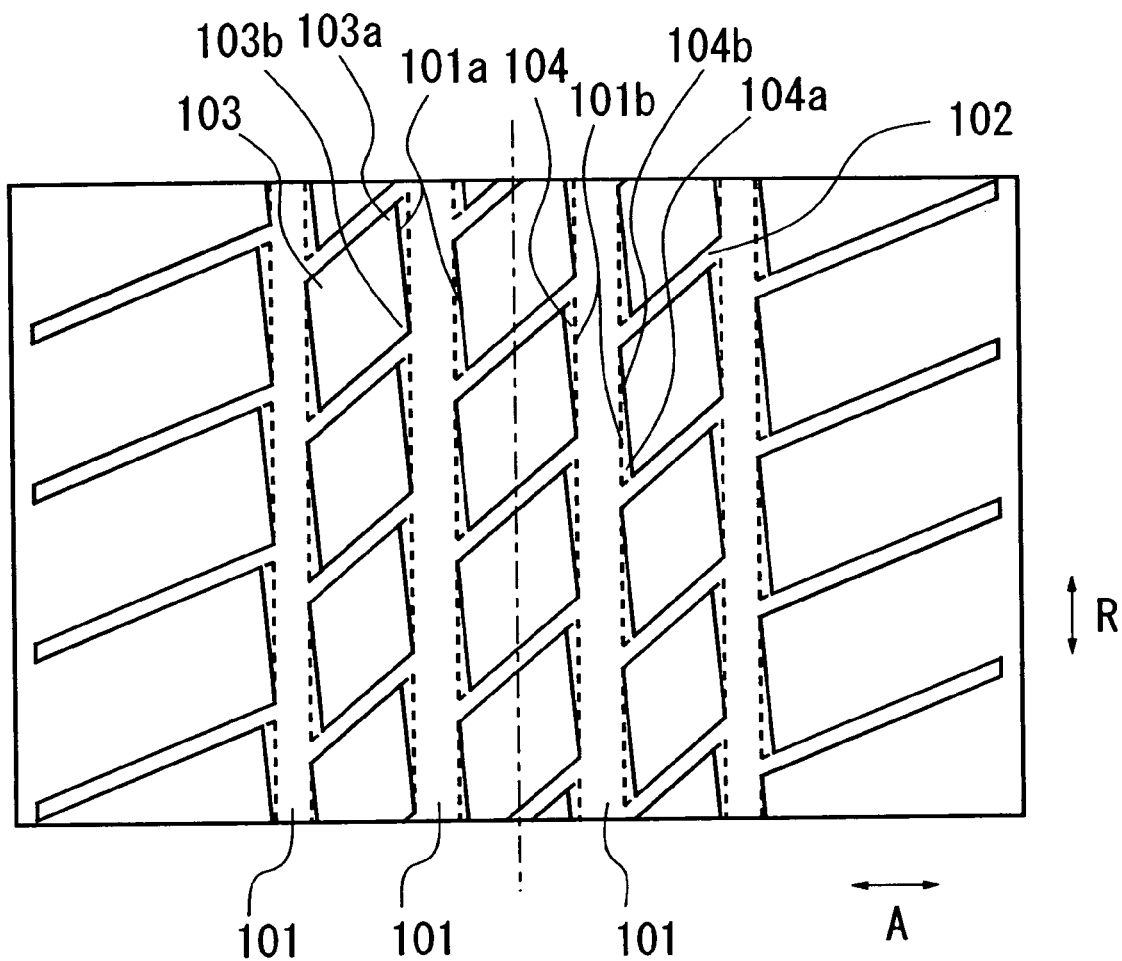
FIG. 1 shows a pattern of a pneumatic tire as related art.
Figure 2:
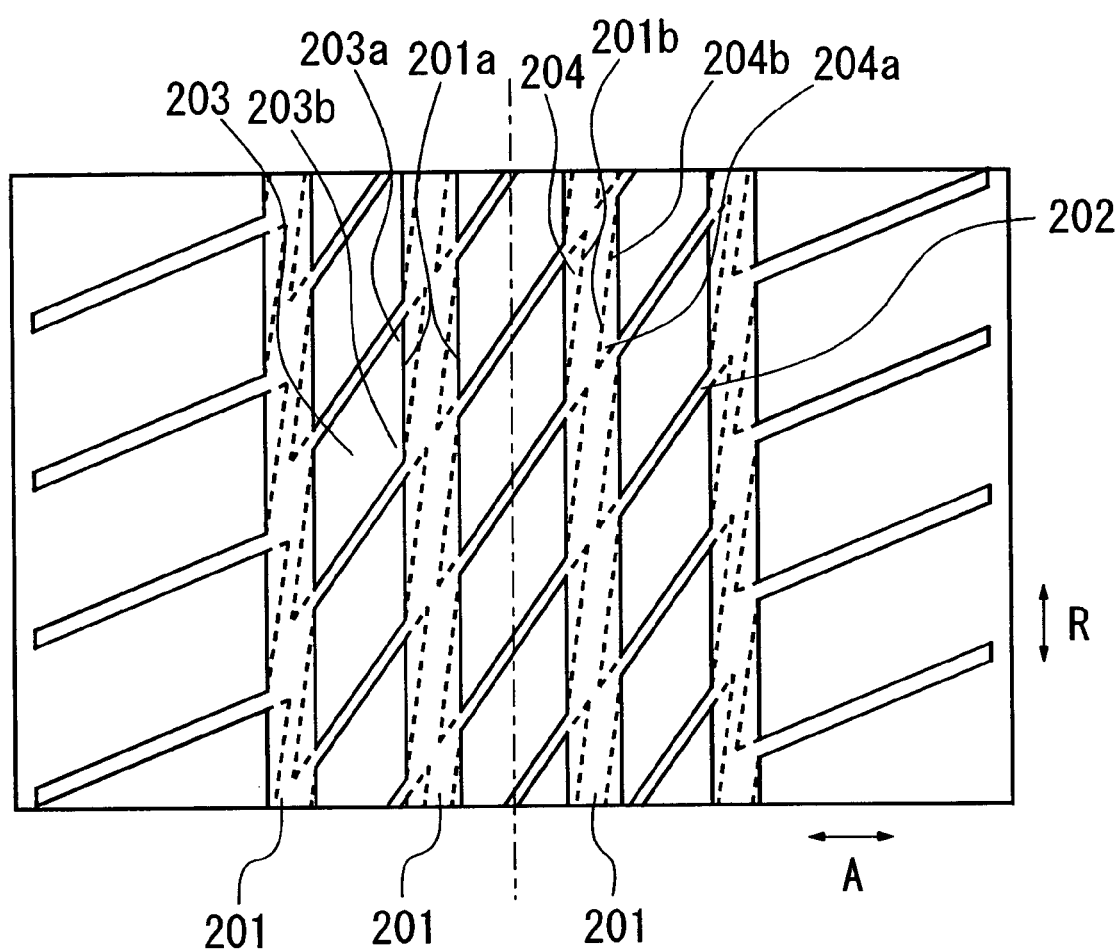
FIG. 2 shows another pattern of a pneumatic tire as related art.
Figure 3A:
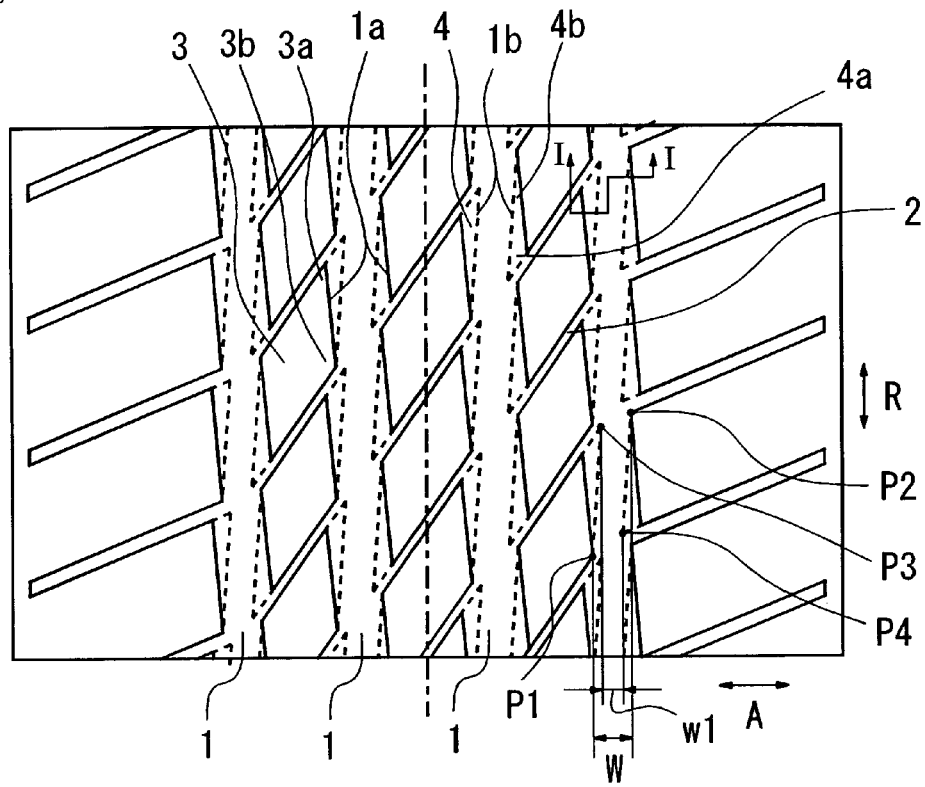
FIG. 3(a) shows a pattern of a pneumatic tire of an embodiment according to the present invention.

FIG. 3(a) shows a pattern of a pneumatic tire of an embodiment according to the present invention. As shown in FIG. 3(a), main grooves 1 extend substantially in the circumferential direction R of the tire, and transverse grooves 2 extend obliquely with respect to the widthwise direction A of the tire so as to connect the main grooves 1. Thus, substantial parallelogram blocks 3 are formed.

Figure 3B:
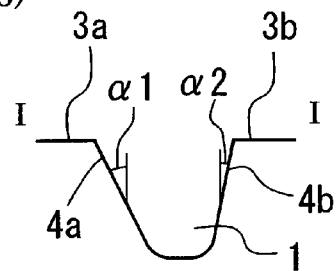
FIG. 3(b) is an enlarged cross-sectional view taken along the line I—I in FIG. 3(a)
Figure 3C:
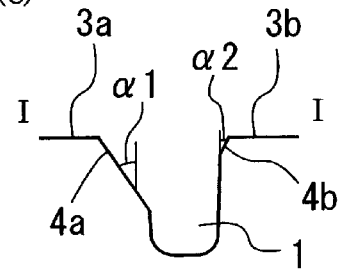
FIG. 3(c) is an enlarged cross-sectional view showing a modified embodiment corresponding to the embodiment shown in FIG. 3(b)
Figure 3D:
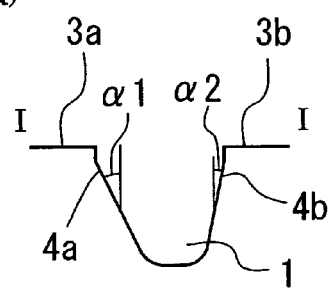
FIG. 3(d) is an enlarged cross-sectional view showing another modified embodiment corresponding to the embodiment shown in FIG. 3(b)
Figure 3E:
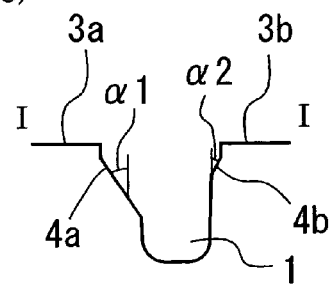
FIG. 3(e) is an enlarge cross-sectional view showing still another modified embodiment corresponding to the embodiment shown in FIG. 3(b)

As shown in FIG. 3(b) which is an enlarged cross-section taken along the line I—I in FIG. 3(a), the groove side 4b of the block 3 at the side of the obtuse corner portion 3b forms an angle of a2, which is slightly inclined, but the groove side 4a at the side of the acute corner portion 3a forms an angle of a1 which has a greater inclination than that of a2. Therefore, the rigidity of the acute corner portion 3a of the block 3 is enhance, and therefore the rigidity of the block 3 is equalized, enabling the prevention of irregular wear. The inclination of some portions of the groove side 4a and 4b at the tread surface side can be changed and the other portions of the groove side can be formed into substantially vertical groove sides. In the modification shown in FIG. 3(c), the portions of the groove sides near the groove bottom side are formed into substantially vertical groove sides. In another modification shown in FIG. 3(d), the portions of the groove sides near the tread surface side are formed into substantially vertical groove sides. In still another modification shown in FIG. 3(e), the portions of the groove sides near the groove bottom side and near the tread surface side are formed into substantially vertical groove sides, respectively.

It is preferable that the maximum value of the inclination angle a1 of the groove side 4a at the side of the block acute corner portion 3a is set to be 60° to 5°, and that the minimum value of the inclination angle a2 of the groove side 4b at the side of the block obtuse corner portion 3b is set to be 60° to 0°. It is preferable that the inclination angle of the groove side 4 gradually decreases from the maximum value of a1 to the minimum value of a2.

At the tread surface level, the main groove 1 extends in the oblique direction 1a (in FIG. 3(a), the direction from the upper left side to the lower right side) with respect to the circumferential direction R of the tire. This enhances the traction performance due to the edge effect in the circumferential direction R of the tire. As aforementioned, since the inclination angles of the groove side 4 are different at the corner portions, the extending direction of the main groove finally changes such that the absolute value of the angle with respect to the circumferential direction R of the tire does not increase. In other words, at the groove bottom level, the main groove 1 extends in the oblique direction 1b (in FIG. 3(a), the direction from the upper right side to the lower left side) with respect to the circumferential direction R of the tire, which is a direction opposite to the extending direction of the main groove at the tread surface level.

With such a structure, the narrowest distance w1 in the main groove 1 at the groove bottom level is not extremely small as compared with the narrowest distance W of the main groove 1 at the tread surface level. As a result, good drainage performance can be attained at the wear end stage. In addition, good traction performance can be acquired as well since the main groove 1 extends slightly in the oblique direction 1b with respect to the circumferential direction R of the tire.

Figure 8:
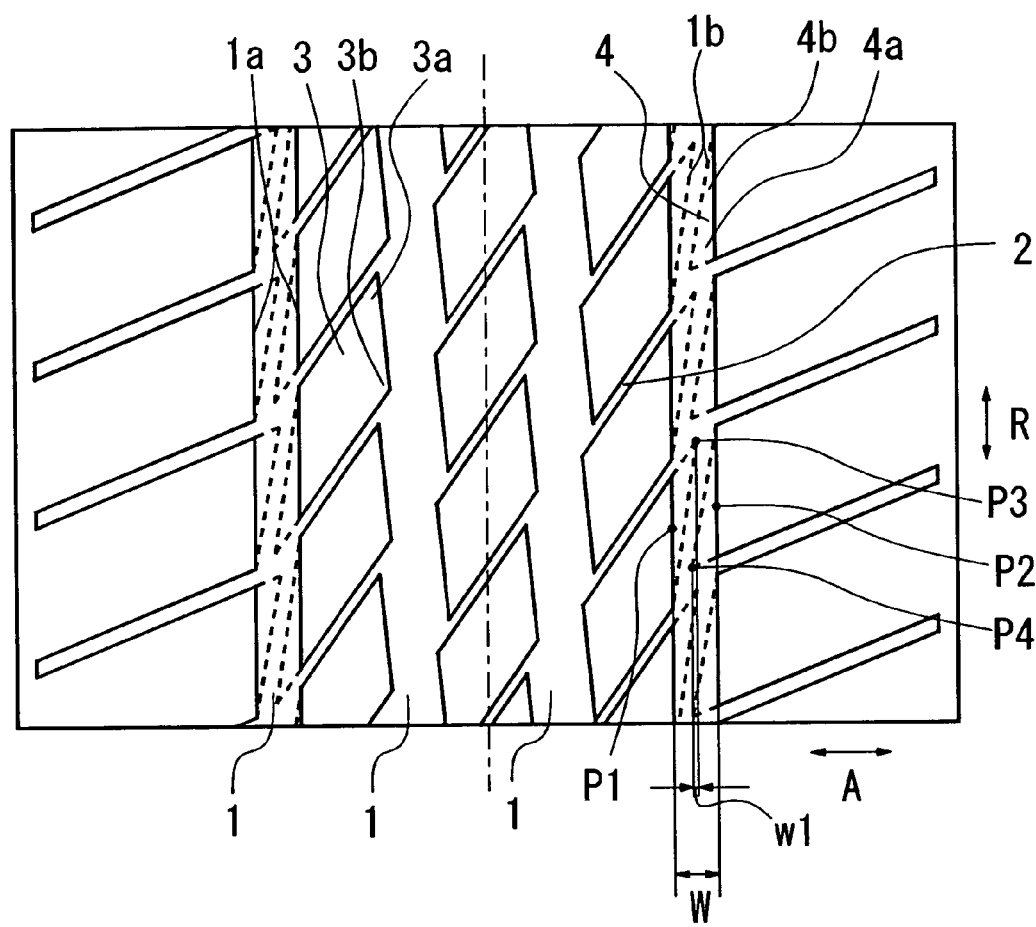
FIG. 8 shows a pattern of a pneumatic tire of Comparative Example 2 as related art.

Here, the narrowest distance in the main groove 1 means a distance in the widthwise direction A of the tire between the nearest points of the facing groove sides. For example, at the tread surface level, the narrowest distance is the distance W in the widthwise direction A of the tire between the nearest points P1 and P2 of the facing groove sides. At the groove bottom level, the narrowest distance is the distance w1 in the widthwise direction A of the tire between the nearest points P3 and P4 of the facing groove sides. Further, when one of the nearest points of the facing groove sides is closer to the facing groove side than the other of the nearest points of the facing groove sides, the nearest distance becomes a negative value (in the case of Comparative Example 2 as shown in FIG. 8 which will be mentioned later).

Therefore, when the narrowest distance w1 in the main groove at the groove bottom level becomes a negative value, the drainage performance deteriorates since a satisfactory groove width cannot be ensured at the wear end stage. Furthermore, when the narrowest distance w1 exceeds the narrowest distance W at the tread surface level, it becomes impossible to change the inclination angles of the groove sides, and therefore irregular wear cannot be prevented.

Figure 4:
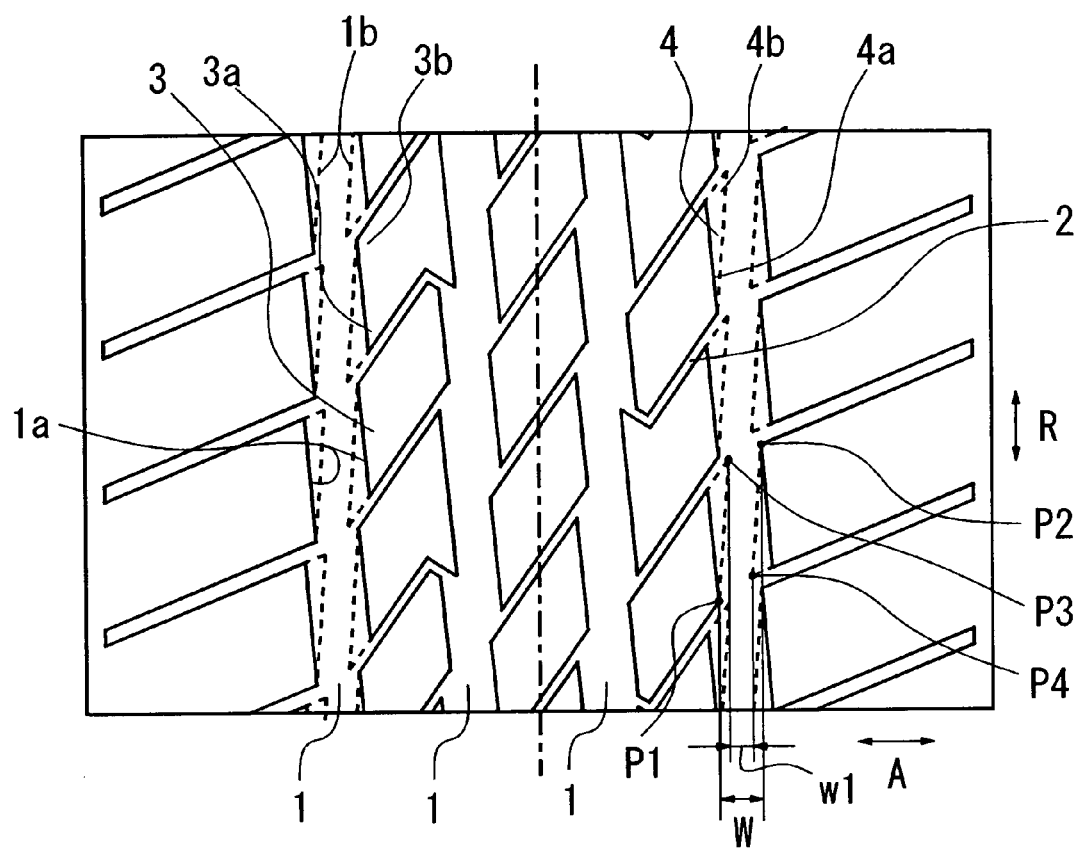
FIG. 4 shows a pattern of a pneumatic tire of another embodiment according to the present invention.
Figure 5:
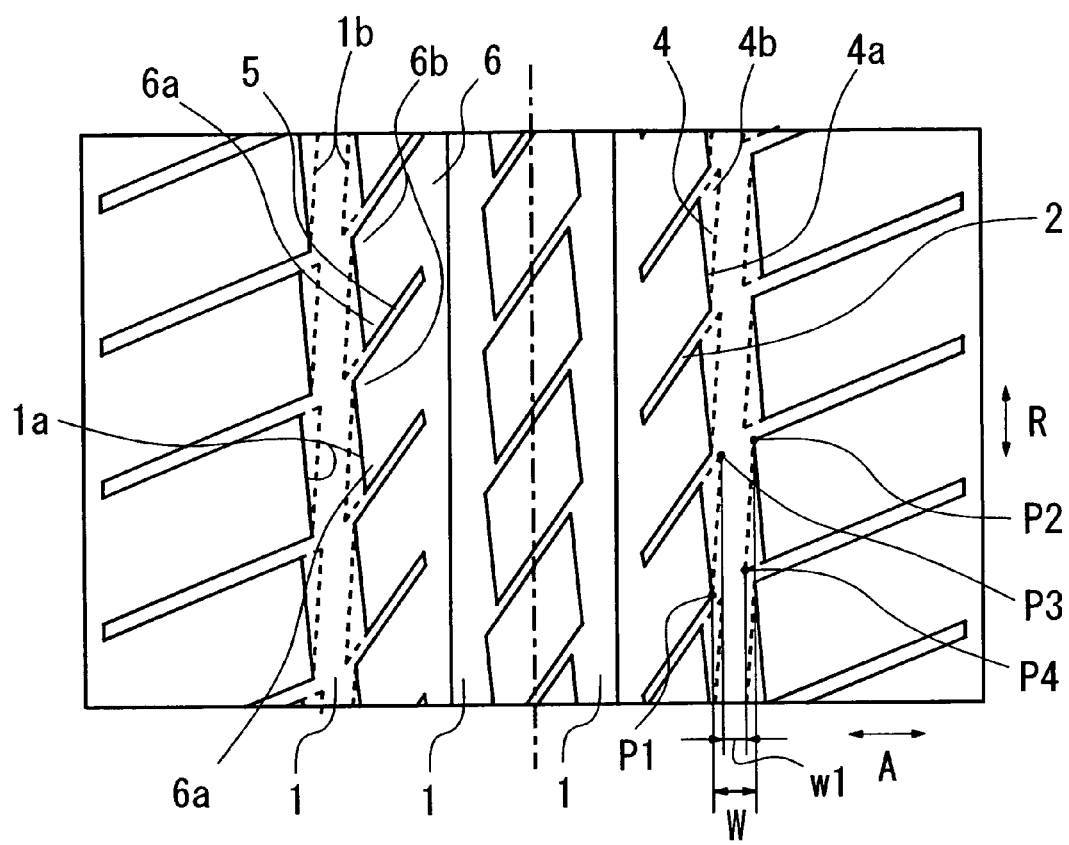
FIG. 5 shows a pattern of a pneumatic tire of still another embodiment according to the present invention.

Groove sides of all the main grooves can be inclined so as to change the inclination angle thereof. Alternatively, groove sides of a certain main groove can be inclined so as to change the inclination angle thereof. This inclination of the groove side is particularly effective to the groove sides of the main groove at the outermost side where irregular wear is likely to occur. In addition, as shown in FIG. 4, the inclination of the groove side can also be applied to the block 3 having bent transverse grooves 2 and having an acute corner portion 3a and an obtuse corner portion 3b only on one side of the block 3. Furthermore, as shown in FIG. 5, the aforementioned inclination of the groove side can also be applied to the rib 6 formed by main grooves 1 and 1, wherein a transverse groove 5 is opened to the main groove 1 at one end and closed at the other end in the rib 6 and the rib 6 has acute corner portions 6a and obtuse corner portions 6b.

EXAMPLE

Figure 6:
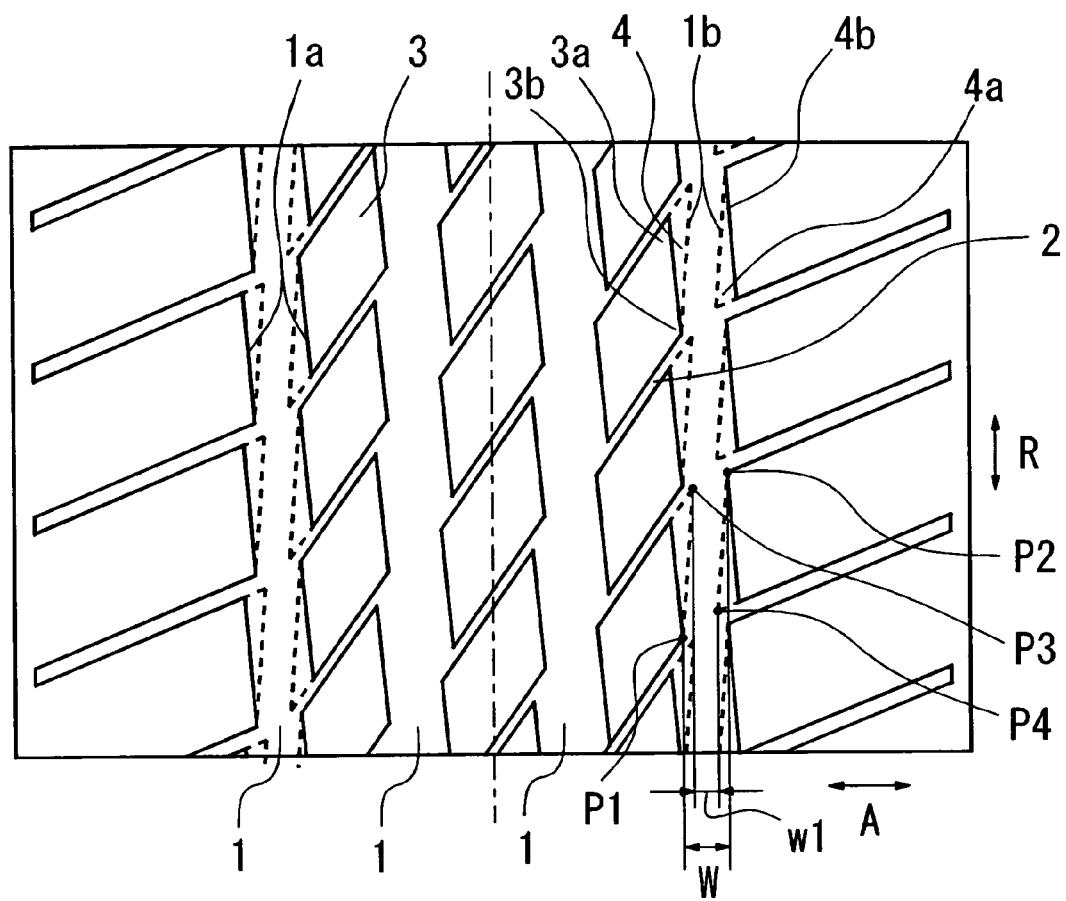
FIG. 6 shows a pattern of a pneumatic tire of Example of the present invention.
Figure 7:
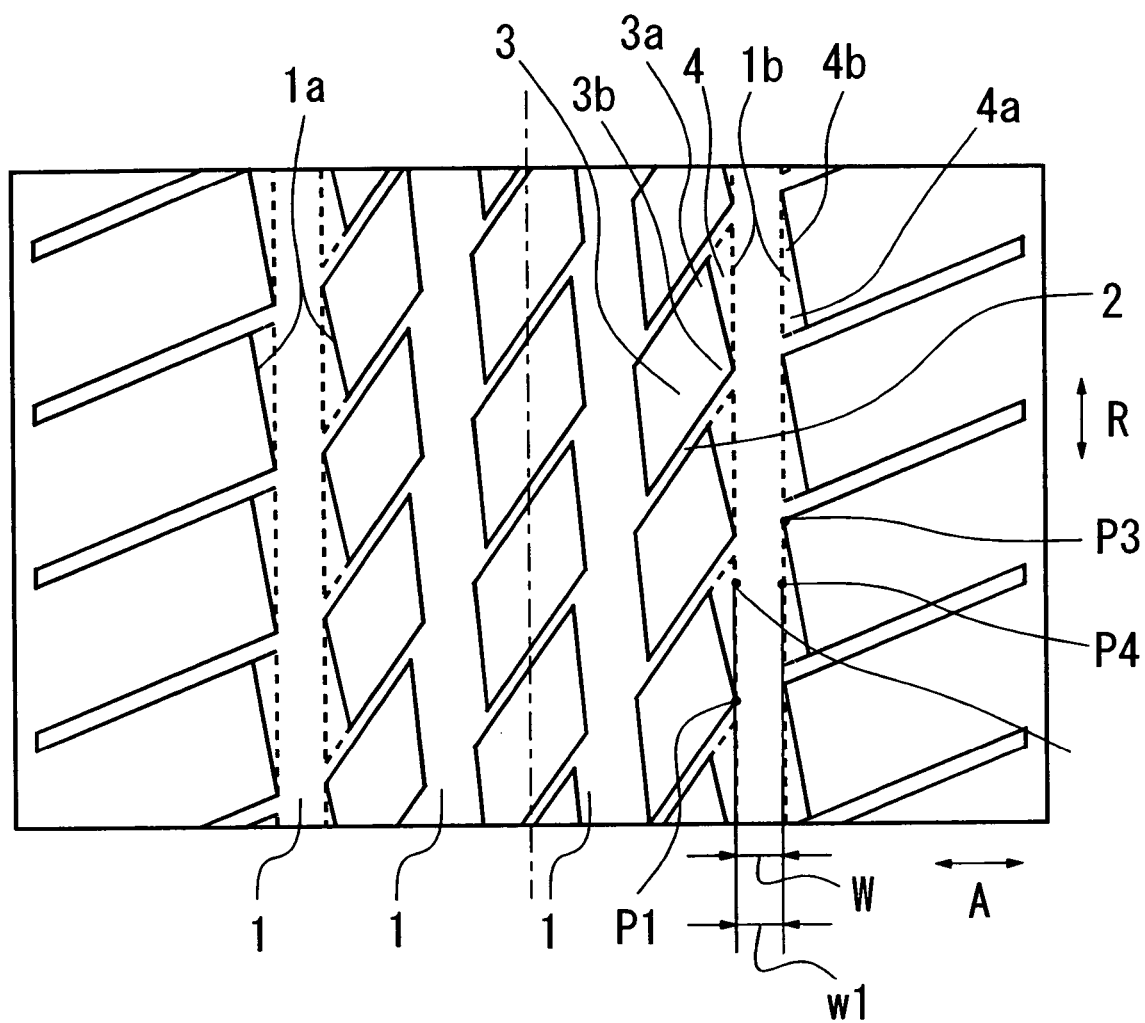
FIG. 7 is shows a pattern of a pneumatic tire of Comparative Example 1 as related art.

As an Example, a pneumatic tire according to the present invention was prepared. On the other hand, as Comparative Examples 1 and 2, pneumatic tires in which an extending direction of the main groove at the tread surface level and the extending direction of the main groove at the groove bottom level are not opposite were prepared. Then, these tires were applied to a four-wheel-drive domestic car of 2000 cc to evaluate each performance. The pattern of Example is shown in FIG. 6 and the patterns of Comparative Examples 1 and 2 are shown in FIGS. 7 and 8. In all of these tires, the inclination angles of the groove sides at the outermost main grooves were changed. In these tires, the maximum value of the inclination angle a1 of the groove side 4a at the side of the block acute corner portion 3a was 30° and the minimum value of the inclination a2 of the groove side 4b at the side of the block obtuse corner portion 3b was 0°. The tire size was 225/70R16 and the air pressure was 210 kPa. Snow resistant performance was evaluated by a feeling evaluation value while running on a snowy road course, hydroplaning performance was evaluated by a speed at which hydroplaning occurred while running on a wet road with water depth of 8 mm. Snow resistant performance and hydroplaning performance were represented by an index setting the evaluation value of Comparative Example 1 to be 100 when a brand-new tire was used. The results are shown in Table 1. "At a time of wear" denotes the time after a car run 12000 km on a general road. In addition, toe and heel wear amount is an irregular wear amount after running 12000 km on a general road.

TABLE 1

|  | Example | Comparative Example 1 | Comparative Example 2 |
|---|---|---|---|
| Main groove width W (mm) on the tread surface | 10 | 10 | 10 |

TABLE 1-continued

|  | Example | Comparative Example 1 | Comparative Example 2 |
|---|---|---|---|
| Main groove width w1 (mm) at the groove bottom | 2 | 10 | −2 |
| Snow resistant performance with a brand-new tire | 100 | 100 | 95 |
| Snow resistant performance with a tire at a time of wear | 96 | 85 | 91 |
| Hydroplaning performance with a brand-new tire | 98 | 100 | 95 |
| Hydroplaning performance with a tire at a time of wear | 92 | 95 | 86 |
| Toe and heel wear amount (mm) | 0.9~1.3 | 1.6~2.0 | 0.7~1.1 |

The results shown in table 1 reveal that irregular wear was prevented and both the good drainage performance and the traction performance were attained at the wear end stage in a pneumatic tire of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A pneumatic tire, comprising:
    main grooves formed on a tread of said tire, each of said main grooves extending substantially in a circumferential direction of said tire; transverse grooves formed on said tread, each of said transverse grooves connecting adjacent main grooves; and
    blocks each formed by said adjacent main grooves and adjacent transverse grooves, each of said blocks having an acute corner portion and an obtuse corner portion on at least one side of a widthwise direction of said tire and also having a groove side extending along one of said main grooves between said acute corner portion and said obtuse corner portion,
    wherein an inclination angle of said groove side at said one of said main grooves that is outermost in said widthwise direction of said tire of each of said blocks increases from said obtuse corner portion toward said acute corner portion, said inclination angle being defined by an angle formed between an inclination direction of said groove side and a radial direction of said tire at a transverse cross-section of said tire, and
    wherein an extending direction of said one of said outermost main grooves formed between adjacent blocks at a tread surface level is inclined toward one side of said one of said outermost main grooves with respect to said circumferential direction of said tire, while an extending direction of said one of said outermost main grooves formed between adjacent blocks at a groove bottom level is inclined toward the other side of said one of said outermost main grooves with respect to said circumferential direction of said tire.

2. The pneumatic tire as set forth in claim 1, wherein the narrowest gap in said one of said main grooves at said groove bottom level is not less than 0 but not larger than the narrowest gap in said one of said main grooves at said tread surface level.

3. A pneumatic tire, comprising:
    main grooves formed on a tread of said tire, each of said main grooves extending substantially in a circumferential direction of said tire;
    transverse grooves formed on said tread, each of said transverse grooves connecting adjacent main grooves and extending obliquely with respect to a widthwise direction of said tire; and blocks each having a substantial parallelogram shape formed by said adjacent main grooves and adjacent transverse grooves, each of said block having an acute corner portion and an obtuse corner portion and also having a groove side extending along one of said main grooves between said acute corner portion and said obtuse corner portion,
    wherein an inclination angle of said groove side at said one of said main grooves that is outermost in said widthwise direction of said tire of each of said blocks increases from said obtuse corner portion toward said acute corner portion, said inclination angle being defined by an angle formed between an inclination direction of said groove side and a radial direction of said tire at a transverse cross-section of said tire, and
    wherein an extending direction of said one of said main grooves formed between adjacent blocks at a tread surface level is inclined toward one side of said one of said main grooves with respect to said circumferential direction of said tire, while an extending direction of said one of said main grooves formed between adjacent blocks at a groove bottom level is inclined toward the other side of said one of said main grooves with respect to said circumferential direction of said tire.

4. The pneumatic fire as set forth in claim 3, wherein the narrowest gap of said one of said main grooves at said groove bottom level is not less than 0 but not larger than the narrowest gap in said one of said main grooves at said tread surface level.

5. A pneumatic tire, comprising:
ribs each formed by main grooves extending substantially in a circumferential direction of said tire and transverse grooves extending obliquely with respect to a widthwise direction of said tire, each of said ribs having acute corner portions and obtuse corner portions and also having a groove side extending along one of said main grooves between said acute corner portion arid said obtuse corner portion,
wherein an inclination angle of said groove side at said one of said main grooves that is outermost in said widthwise direction of said tire of each of said ribs increases from said obtuse corner portion toward said acute corner portion, said inclination angle being defined by an angle formed between an inclination direction of said groove side and a radial direction of said tire at a transverse cross-section of said tire, and
wherein an extending direction of said one of said main grooves formed between adjacent ribs at a tread surface level is inclined toward one side of said one of said main grooves with respect to said circumferential direction of said tire, while an extending direction of said one of said main grooves formed between adjacent ribs at a groove bottom level is inclined toward the other side of said one of said main grooves with respect to said circumferential direction of said tire.

6. The pneumatic tire as set forth in claim 5, wherein the narrowest gap in said one of said main grooves at said groove bottom level is not less than 0 but not larger than the narrowest gap in said one of said main grooves at said tread surface level.

* * * * *